Inventor:
Thomas M. Larson
By: James E. Nilles
Attorney

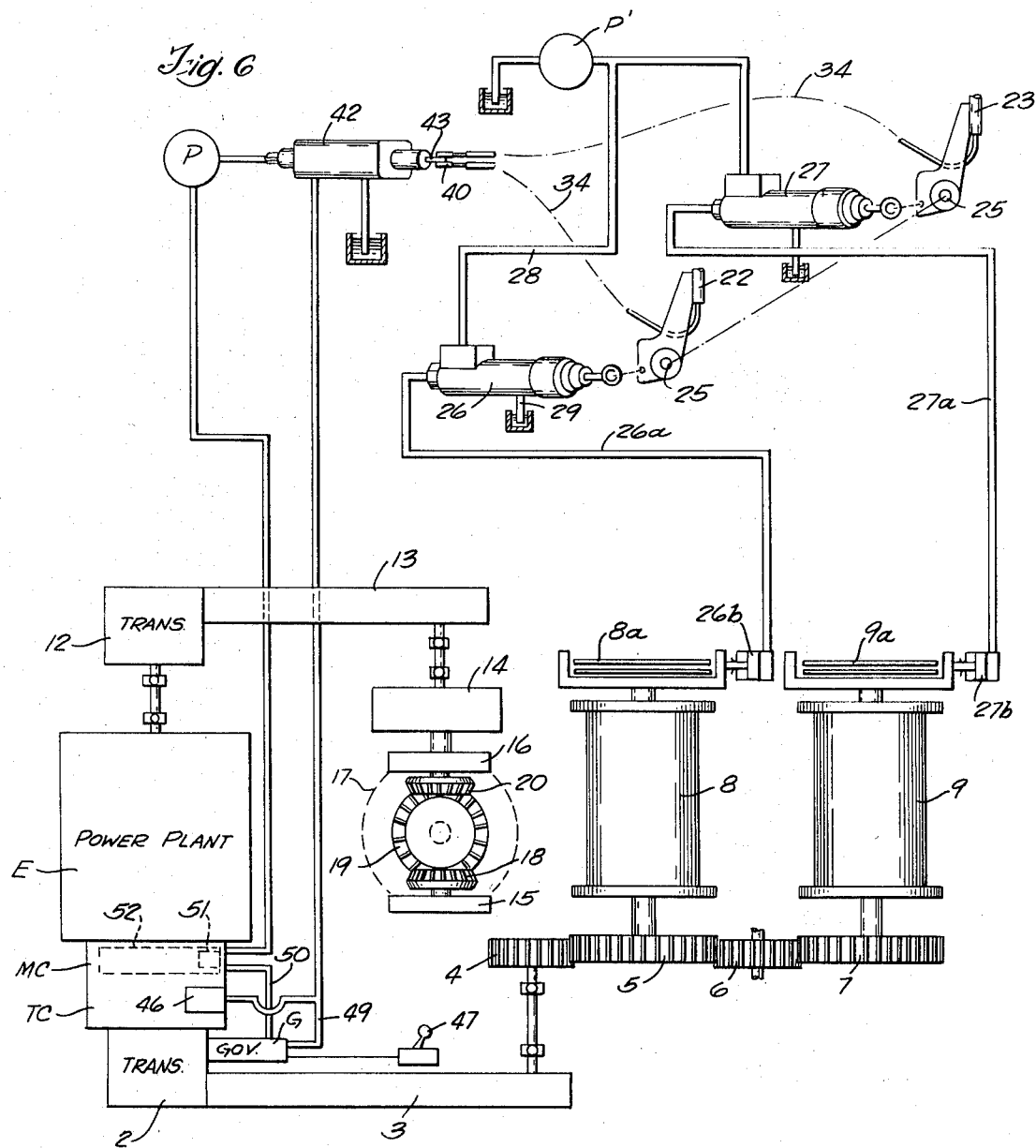

United States Patent Office 3,541,596
Patented Nov. 17, 1970

3,541,596
TRUCK CRANE WITH CLUTCH AND TORQUE CONVERTER CONTROLS
Thomas M. Larson, Milwaukee, Wis., assignor to Harnischfeger Corporation, Milwaukee, Wis., a corporation of Wisconsin
Filed Oct. 10, 1968, Ser. No. 766,602
Int. Cl. B66c 23/84
U.S. Cl. 212—69    9 Claims

ABSTRACT OF THE DISCLOSURE

Manual control means for a truck crane or the like for simultaneous control of the modulatable torque converter and the hydraulically actuated clutches for the main hoist drums.

BACKGROUND OF THE INVENTION

Machinery of the type to which the present invention pertains usually has a main power plant such as a torque converter for propelling the vehicle and also has a pair of clutch operated hoist drums for operating parts of the machinery. Controls for these various functions and parts of the machinery are manipulated by a single operator as are other functions and controls of the machine. It is important that the operator is able to control all of these functions and components of such a machine with accuracy, speed, a minimum effort and complete safety. The attention of the operator under working conditions is further diverted by loading conditions and other equipment and personnel working along side the machinery.

An example of machinery of this character is shown in the British Pat. 799,035 of 1958 and in the U.S. Pat. 3,221,896, issued Dec. 7, 1965 to Grall.

SUMMARY OF THE PRESENT INVENTION

The present invention relates generally to a power transmission mechanism for a truck crane or the like including a pair of transmissions, one driven from either end of a power source; one transmission drives the boom hoist and swing mechanism for the revolvable upper portion of the crane, while the other transmission is driven from the power source by a modulatable torque converter and this transmission drives a pair of main hoist drums and also propels the vehicle over the ground. The power source can maintain a constant speed and provides constant power for all functions such as the boom hoist, swing and main hoists. The speed of the boom hoist and swing drive is controlled by the engine throttle while the speed of the main hoist is controlled by varying the power through the modulatable torque converter.

Specifically, the present invention provides an improved control means for the above mechanism, the control means including a pair of control members, each one controlling a valve for each of the pair of hoist drum clutches, and in addition, either one of these control members can simultaneously control the modulated torque converter that provides power to these hoist drums.

Another aspect of the invention relates to a control means as above mentioned and in which the torque converter may also furnish power to the boom hoist clutch and swing clutch for the revolvable upper portion of the machine.

BRIEF DESCRIPTION OF THE DRAWINGS

FIG. 3 is a rear, elevational view of the control means, taken generally along line 3—3 in FIG. 2, but on a reduced scale, certain parts being omitted for clarity;

FIG. 5 is a cross sectional view, on an enlarged scale, taken along line 5—5 in FIG. 1;

FIG. 6 is a schematic diagram of a transmission with which the present invention is utilized;

DESCRIPTION OF A PREFERRED EMBODIMENT

Figure 1:
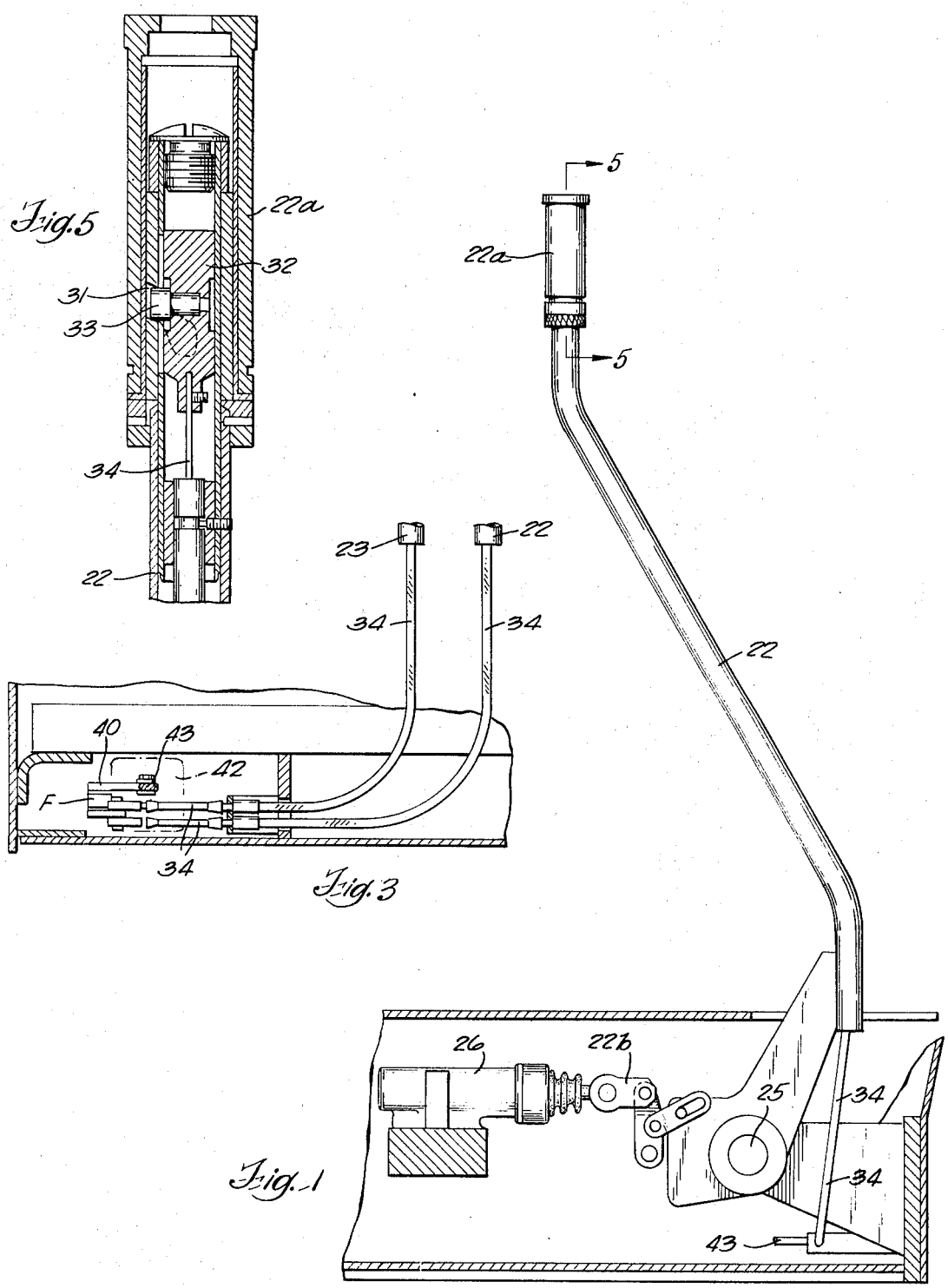
FIG. 1 is a side view of control means made in accordance with the present invention, certain parts being shown as broken away or removed for clarity.
Figure 2:
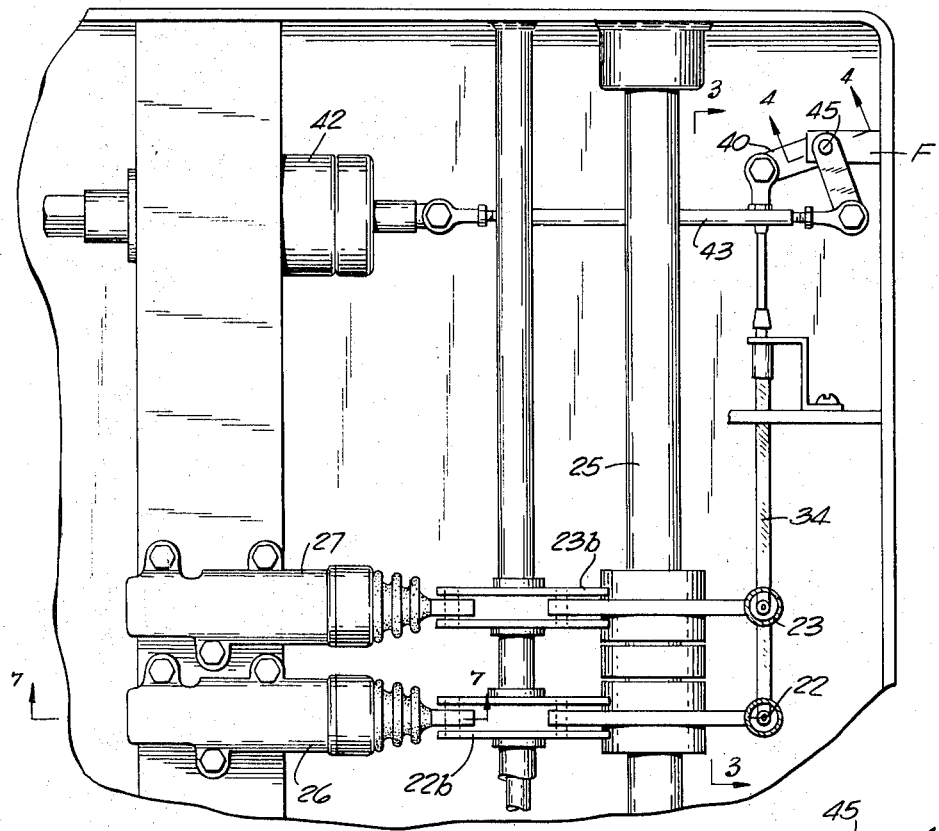
FIG. 2 is a plan view of the control means shown in FIG. 1, certain parts being shown as broken away or removed for clarity.
Figure 4:
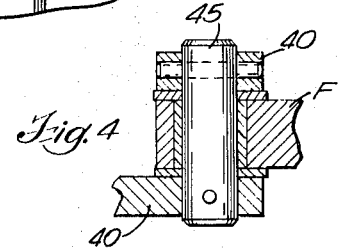
FIG. 4 is a cross sectional view taken along line 4—4 in FIG. 2, but on an enlarged scale.

The schematic diagram of FIG. 6 shows a transmission, of a truck crane for example, with which the present invention is used. This transmission includes a power plant in the form of an internal combustion, diesel engine E which provides constant power for all functions of the machine, such as the boom hoist, the swing and main hoists and other functions. When the crane is in operation, this engine may be maintained at approximately the same constant speed. The engine E drives a modulatable friction plate type clutch MC connected to a torque converter TC, the torque converter in turn furnishing power to a two-speed transmission 2. The transmission 2 through a chain drive 3 and gear means 4, 5, 6 and 7, drives the two main hoist drums, that is rear drum 8 and the front drum 9 of the crane. The speed of these main hoist drums 8 and 9 is controlled by varying the power through the torque converter TC by means of the modulated clutch MC.

The other end of the engine E furnishes power to a two speed mechanical transmission 12 which in turn drives through a chain drive 13 to the boom hoist clutch 14. A pair of electro-magnetic clutch means 15, 16 are also provided on the upper revolvable part 17 of the crane and these clutches through the appropriate gearing 18, 19 and 20 act to rotate the upper portion 17 of the crane in the known manner. In this way, the engine furnishes power to the boom hoist and swing drive and their input speed is controlled by the engine throttle.

As previously indicated, the engine E can remain at approximately the same constant speed and provide constant power for the boom hoist, the swing and the main hoists. The speed of the main hoist drums 8 and 9 is controlled by varying the power through the torque converter by means of the modulated clutch. The speed of the boom hoist and swing drive is controlled by the engine throttle.

CONTROLS

The control of the modulated clutch torque converter TC is separate from the control of the main drum clutches 8 and 9, however, the torque converter TC can be simultaneously controlled with the control of either one of the hydraulically actuated front or rear drum clutches 8a or 9a, as will appear.

A pair of swingable control levers 22 and 23 are provided, lever 22 being provided for the control of the rear drum clutch 8a, while lever 23 is provided for the control of the front drum clutch 9a. The modulated torque converter is controlled by simply rotating the grip or handle portions 22a and 23a, respectively, of levers 22 and 23. These levers each also control the flow of fluid to the drum clutch 8a and 9a by fore-and-aft swinging movement of the levers.

Figure 7:
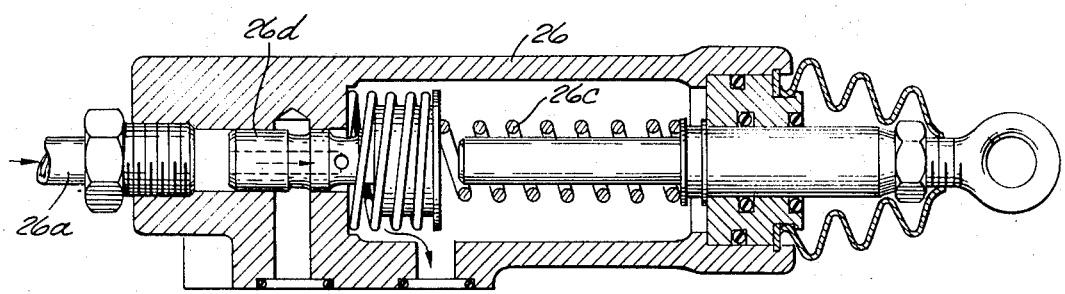
FIG. 7 is a cross sectional, enlarged view taken along line 7—7 in FIG. 2.

More specifically, the levers 22 and 23 are swingably mounted about a shaft 25 and are connected by link means 22b and 23b respectively to the control valves 26 and 27. These valves 26 and 27 are identical and are connected by conduit 26a and 27a to the hydraulic cylinder means 26b and 27b which actuate the rear and front drum clutches, respectively. Thus, swinging movement in a fore-and-aft direction of the levers causes corresponding movement of the hydraulic control valves 26 and 27, which are of the variable pressure, spring returned type. Valve 26 is shown in FIG. 7 in the neutral position in which the fluid line 28 from the fluid pump P is blocked and fluid flows from line 26a, through the spool and out the line 29 to the reservoir. In the clutch engaging position, spring 26c actuates its spool 26d to the left to admit pressure fluid via line 28, through the center passage in the spool 26d, then out line 26a and to cylinder 26.

The control levers 22 and 23 are identical and have a rotatable grip portion or handle 22a, 23a (FIG. 5) in which is formed a cam groove 31. A plunger 32 is located in the handle and has a cam follower 33 attached thereto. A push-pull or bowden cable 34 is fixed to the plunger 32 and extends downwardly through the tubular lever 22 and is connected to one end of a bell crank 40. Rotation of the grip is translated to linear movement of the bowden cable, to thereby move the bell crank 40. The bell crank permits a change in ratio as well as a 90 degree direction change. The ratio change is necessary to match the cam follower travel to the control valve stem travel.

As the construction and operation of the levers and their hand grips are identical, only one has been described. It is noted, however, that the bowden cables of both levers 22 and 23 are secured to the bell crank 40 and thus either hand grip can be rotated independently to move the bell crank 40 and the associated modulatable clutch control valve 42 associated therewith. The modulated clutch control valve 42 is also of the variable pressure type and is connected by the link 43 to the bell crank 40. The bell crank 40 is pivoted at 45 to the main frame F of the machine.

With the present control arrangement, a control lever is provided for each of the valve means 26 and 27 of front drum and the rear drum clutches 8a and 9a. Furthermore, each lever has a connection with the modulated clutch valve 42 so that the operation of the modulated torque converter TC can be controlled simultaneously with the control of each of the main hoist drums 8 and 9.

The hydraulic control system shown in FIG. 6 provides variable pressure to each of cylinders 26b and 27b of the main drum clutches 8a and 9a, and this control system is fully independent from the torque converter hydraulic system. As above indicated, the modulated clutch torque converter is controlled by the twist grip on the upper end of the drum clutch levers, and by rotating the twist grip control through a total arc of about 90 degrees, the charging pressure of the torque converter is varied, through a reduced charging pressure control valve 46, from approximately zero to full pressure during the first increment of travel, and then during the second increment of travel the modulated clutch pressure of the clutch MC is varied from zero to full engagement pressure.

Thus, in the above control system, the hydraulic system which controls the main drum clutches is separate from the hydraulic system which controls the converter charging pressure and the modulated clutch. Each system has a separate tank, pump, control valves, and conduits. The two systems operate at different pressures, but are related to one another through the present control system. The maximum system pressure in the main drum clutch system being, for example, about 1,500 p.s.i., while maximum system pressure in the modulated clutch torque converter hydraulic system may be, for example 250 p.s.i.

In addition to the above controls for the main drum clutches and the modulated clutch torque converter controls, there is provided an output shaft governor control G, which is separated from the other controls. This governor is manually settable by its control lever 47, and the governor is connected to the output shaft 48 of the modulated clutch torque converter TC and is connected via conduit 49 with control valve 42, and by conduit 50 with the centrifugally operated valve 51 located in the flywheel 52 of the modulatable clutch MC. Such modulated clutch torque control is shown and described in the U.S. Pat. 3,358,796 issued Dec. 19, 1967 to C. R. Hilpert.

I claim:

1. A truck crane or the like including a pair of hydraulically actuated hoist clutches, a modulatable clutch, and a torque converter actuated by said modulatable clutch, a control system comprising, valve means for each of said clutches, a pair of swingable control levers and each having an operative connection with the said valve means for said hoist clutches, each of said levers also having a twist grip, said twist grips having a connection respectively to said valve means of said torque converter modulatable clutch, whereby said torque converter modulatable clutch can be controlled by twisting movement of said grips and simultaneously with the control of either of said hoist clutches by swinging movement of said levers.

2. The arrangement as set forth in claim 1 including a power source, a first transmission at one end of said power source, a revovable upper portion on said crane and driven by said first transmission, said modulatable clutch and said torque converter being located at the other end of said power source, a second transmission connected to and driven by said torque converter, a pair of hoist drums operable by said hoist clutches, and a power drive connected between said second transmission and said hoist drums.

3. A device as defined in claim 1 wherein said twist grip connections comprise a push-pull cable connected to a bell crank, and link means connecting said bell crank to said valve means for the modulatable clutch of the torque converter.

4. The combination as described in claim 3 further characterized in that said twist grips including a revolvable grip on each of said levers, and a cam connection between said revolvable grips and said push-pull cable for translating rotary movement of the grip to linear movement of the cables.

5. A device as defined in claim 2 wherein said twist grip connections comprise a push-pull cable connected to a bell crank, and link means connecting said bell crank to said valve means for the modulatable clutch of the torque converter.

6. The combination as described in claim 5 further characterized in that said twist grips including a revolvable grip on each of said levers, and a cam connection between said revolvable grips and said push-pull cable for translating rotary movement of the grip to linear movement of the cables.

7. A truck crane or the like including a power source, a modulatable clutch driven from one end of said power source, a torque converter actuated and driven by said modulatable clutch, a first power transmission driven by said torque converter, a revolvable upper portion on said crane and having a swing clutch for revolving said portion and also having a boom hoist clutch thereon, said crane also having a pair of hoist drums, and a pair of hydraulically actuated hoist clutches for operating said drums, said first power transmission being drivingly connected with said pair of hoist clutches, a second power transmission between the other end of said power source and said boom hoist clutch and swing clutch, a control system comprising, a valve means for each of said pair of clutches, a pair of swingable control levers and each having an operative connection with hoist clutch valve means, each of said levers also having a twist grip, said twist grips each having a connection with their respective modulatable clutch valve means, whereby said torque converter modulatable clutch can be controlled by twisting movement of said grips and simultaneously with the control of either of said hoist clutches by swinging movement of said levers.

8. A device as defined in claim 7 wherein said twist grip connections comprise a push-pull cable connected to a bell crank, and link means connecting said bell crank to said modulatable clutch valve means.

9. The combination as described in claim 8 further characterized in that said twist grips include a revolvable grip one each of said levers, and a cam connection between said revolvable grips and said push-pull cable for translating rotary movement of the grip to linear movement of the cables.

No references cited.

BENJAMIN W. WYCHE III, Primary Examiner

U.S. Cl. X.R.

74—732; 192—83, 87.13, 109, 3.26, 3.27, 3.33; 254—185; 254—185